United States Patent
Dal Zotto

(10) Patent No.: US 11,798,170 B2
(45) Date of Patent: Oct. 24, 2023

(54) IMAGE BACKGROUND ALTERATIONS

(71) Applicant: HEWLETT-PACKARD DEVELOPMENT COMPANY, L.P., Spring, TX (US)

(72) Inventor: Rafael Dal Zotto, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 140 days.

(21) Appl. No.: 17/363,368

(22) Filed: Jun. 30, 2021

(65) Prior Publication Data
US 2023/0005159 A1  Jan. 5, 2023

(51) Int. Cl.
*G06T 7/194* (2017.01)
*G06T 7/174* (2017.01)
*G06T 5/50* (2006.01)
*G06T 5/00* (2006.01)

(52) U.S. Cl.
CPC .............. *G06T 7/194* (2017.01); *G06T 5/002* (2013.01); *G06T 5/50* (2013.01); *G06T 7/174* (2017.01); *G06T 2207/20224* (2013.01)

(58) Field of Classification Search
CPC .......... G06T 7/194; G06T 5/002; G06T 5/50; G06T 7/174; G06T 2207/20224
See application file for complete search history.

(56) References Cited

U.S. PATENT DOCUMENTS

| 9,503,685 | B2 * | 11/2016 | Baron, Jr. ................ G09G 5/14 |
| 2009/0154821 | A1 * | 6/2009 | Sorek ..................... H04N 5/147 |
| | | | 382/250 |
| 2010/0067782 | A1 * | 3/2010 | Dunn ..................... G06T 7/194 |
| | | | 382/162 |
| 2017/0169574 | A1 * | 6/2017 | Xie ........................ G06V 40/23 |
| 2021/0358088 | A1 * | 11/2021 | Lundberg ........... H04N 21/4318 |
| 2022/0350925 | A1 * | 11/2022 | Alexander ............. G06N 20/00 |

OTHER PUBLICATIONS

Hewlett-Packard Development Company, L.P., "Image Frames With Unregistered Users Obfuscated," Indian Patent App No. 202021025415, filed Jun. 17, 2020, 30 p.

Tensor Flow, "BodyPix: Real-Time Person Segmentation in the Browswer With TensorFlow.js," Nov. 18, 2019, 20 p.

* cited by examiner

*Primary Examiner* — Edward F Urban
*Assistant Examiner* — Benedict E Lee
(74) *Attorney, Agent, or Firm* — QUARLES & BRADY LLP

(57) ABSTRACT

Executable code causes a processor to segment a first frame to determine a background portion of the first frame, and segment a second frame to determine a background portion of the second frame. The executable code causes the processor to compare the background portion of the first frame to the background portion of the second frame to determine a difference between the first frame and the second frame. The executable code also causes the processor to alter the background portion of the second frame responsive to the difference. The executable code causes the processor to display the altered second frame on a display.

16 Claims, 6 Drawing Sheets

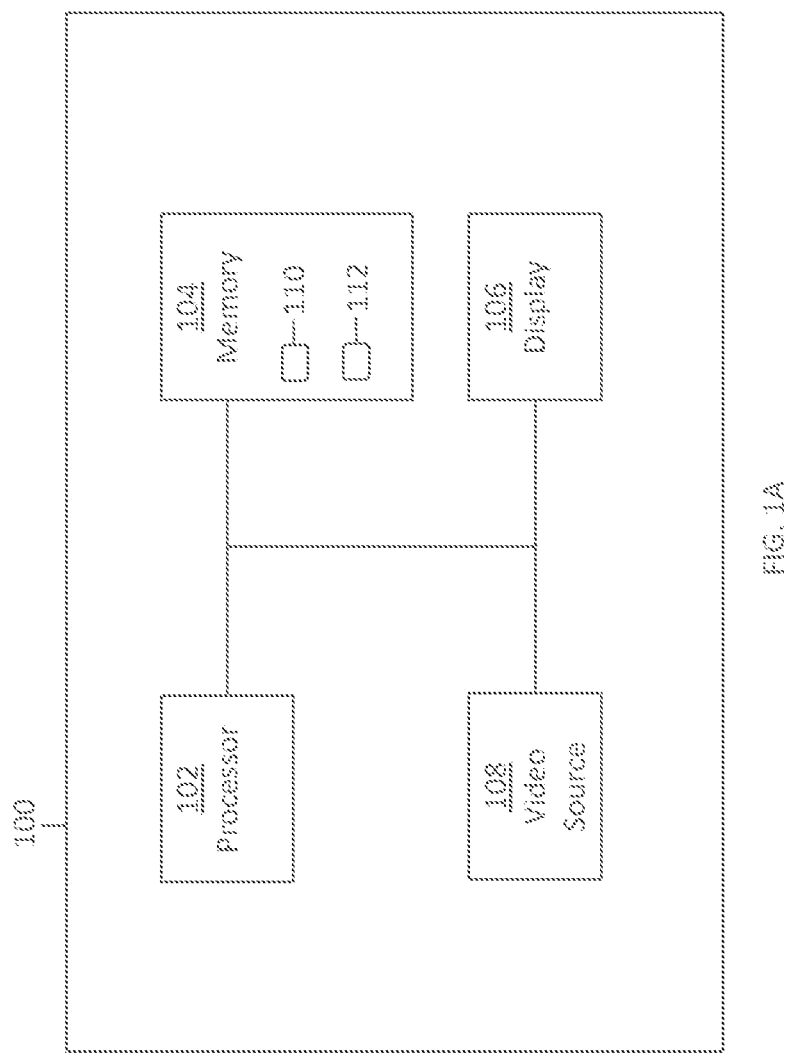

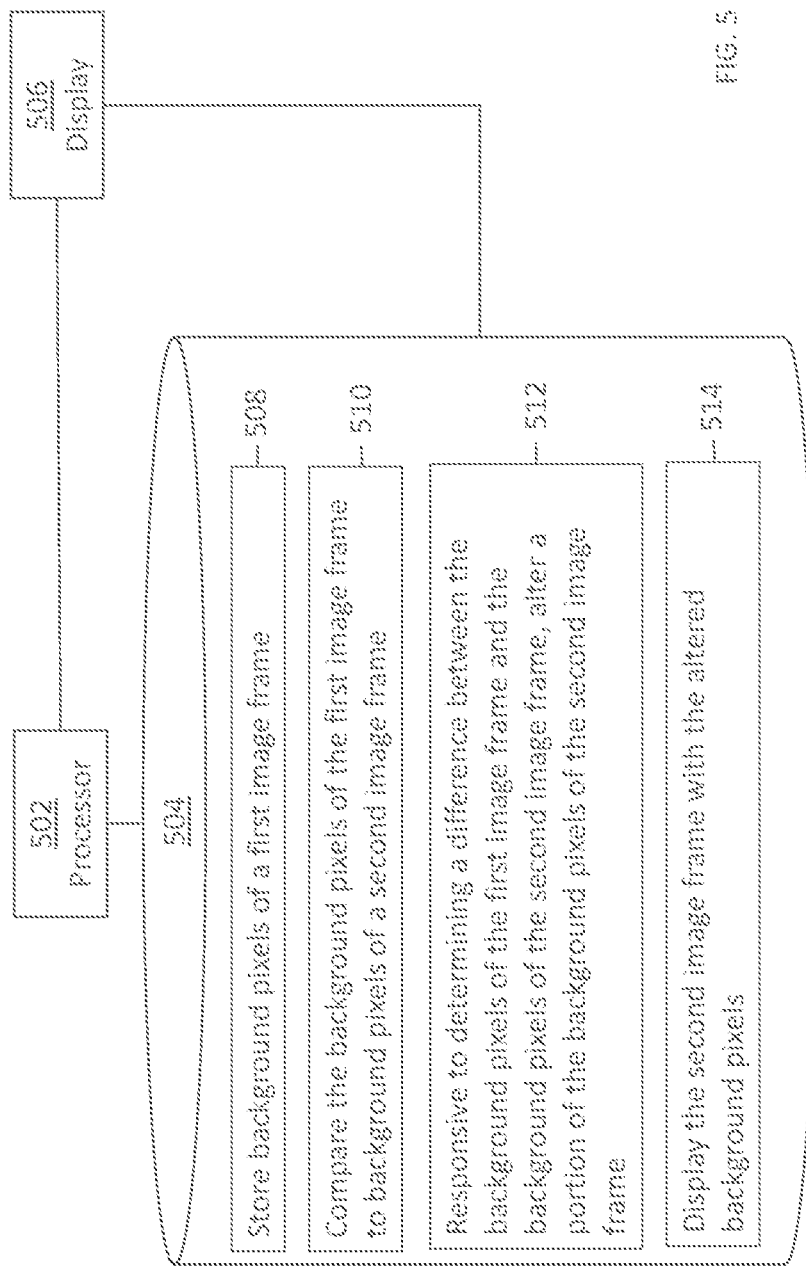

IMAGE BACKGROUND ALTERATIONS

BACKGROUND

The use of background effects in real-time video is a feature offered by many video conference providers. These background effects allow a user to blur, obscure, or replace the user's background, which may be distracting to other viewers, particularly when there is movement in the background.

BRIEF DESCRIPTION OF THE DRAWINGS

Various examples are described below referring to the following figures:

FIG. 1A is a block diagram of a system for image background alteration in accordance with various examples.

FIG. 5 is a diagram of a system including a non-transitory computer-readable medium storing executable code for background image alteration in accordance with various examples.

DETAILED DESCRIPTION

Figure 1B:
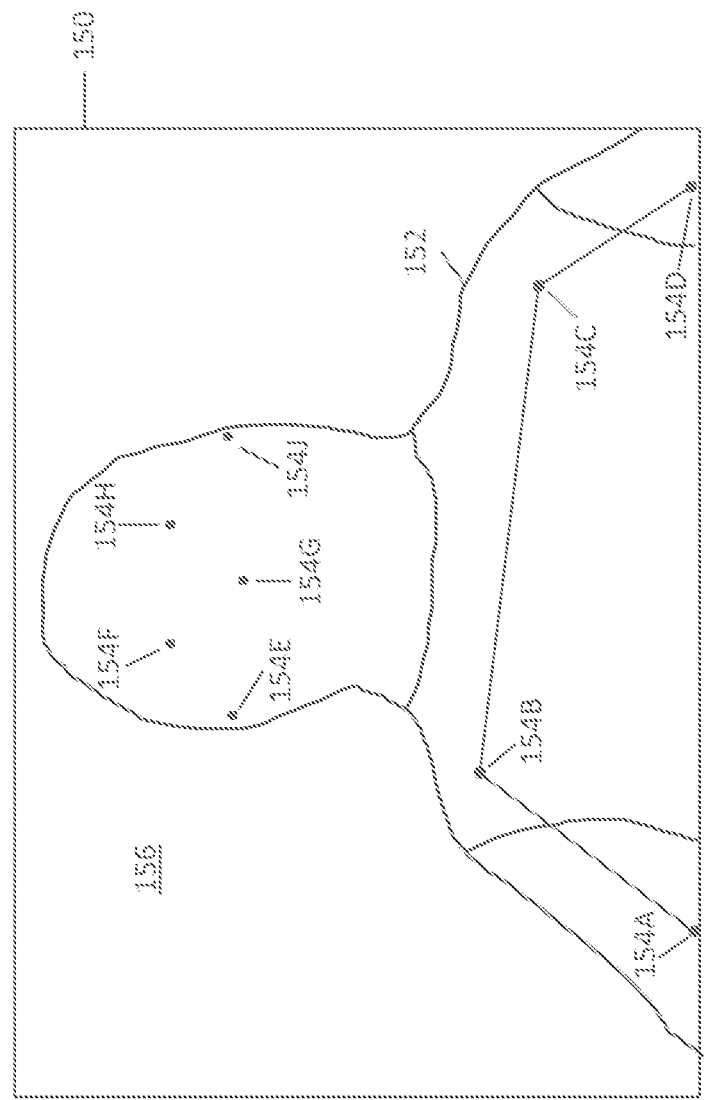
FIG. 1B is a diagram depicting human segmentation of an image in accordance with various examples.

As described above, the use of background effects in real-time video is a feature offered by many video conference providers. These background effects allow a user to blur or obscure the user's background, which may be distracting to other viewers, particularly when there is movement in the background. However, the user has to enable this feature. If the user forgets to enable the feature or does not timely enable the feature, certain information or images may be unintentionally shared, some of which may be distracting, embarrassing, personal, business confidential, or otherwise unsuitable for sharing.

In examples of this disclosure, machine learning techniques and image transformation techniques are used to automatically perform a mitigation action on the background responsive to detecting certain conditions. The examples herein intelligently apply mitigation actions to the user's background (e.g., obscure the background, such as by blurring) responsive to the detection of certain conditions in the background to avoid distractions. The users may determine how to obscure the background in some examples (such as inserting blur, images, video, etc. into the background). Also, the examples herein may automatically perform mitigation actions on the background without the user having to enable the feature.

In examples, an input video (e.g., from a web camera) is decomposed into a series of frames that are processed in sequence. Human segmentation is used to distinguish the human and non-human (e.g., background) areas of each frame, and motion detection is applied to the non-human areas to determine whether blur or another mitigation action should be performed on the video. First, the person or persons in the foreground of the video are segmented from the person's background. Human segmentation is based on face and body part recognition, with the goal of separating the person or persons in the frame from the background. Other components in the foreground may also be segmented from the background in some examples. A variety of different solutions and techniques may be used to perform the segmentation. In one example, pixels of an image are classified as person or non-person. Then, the non-person portion of the image is analyzed using motion detection to determine whether there is movement in the background.

To identify movement in the background, a previous frame is compared to a current frame to detect a difference in the pixels in the background. A user can set a sensitivity level of the system, which may allow some amount of background movement to occur before a mitigation action is taken. If there is a difference in the pixels greater than the sensitivity level, movement of a background object is detected. After movement is detected, a variety of mitigation actions may be taken. One mitigation action is to apply a blur effect to the background of the image. The blur effect may be applied to the entire background or just to a portion of the background. The blur may be applied instantly or gradually over a number of frames. The user may select how quickly the blur is applied. In another mitigation action, instead of blurring the background, a white or dark color may be applied to the background. In another mitigation action, an image may be applied to the background, where the image applied is pre-selected by the user.

In one example, a non-transitory computer-readable medium is provided. The non-transitory computer-readable medium includes all electronic mediums or media of storage, except signals. The non-transitory computer-readable medium stores executable code. When executed by a processor of an electronic device, the executable code causes the processor to segment a first frame to determine a background portion of the first frame, and segment a second frame to determine a background portion of the second frame. The executable code causes the processor to compare the background portion of the first frame to the background portion of the second frame to determine a difference between the first frame and the second frame. The executable code also causes the processor to alter the background portion of the second frame responsive to the difference. The executable code causes the processor to display the altered second frame on a display.

In another example, an electronic device is provided. The electronic device includes a processor. The processor receives a video including a first frame and a second frame. The processor also segments the first frame to distinguish a person in the first frame from a background of the first frame, and segments the second frame to distinguish a person in the second frame from a background of the second frame. The processor compares the background of the second frame to the background of the first frame. Responsive to the background of the second frame matching the background of the first frame, the processor displays the second frame. Responsive to the background of the second frame being different than the background of the first frame, the processor blurs a portion of the second frame and displays the second frame with the blurred portion.

In another example, a non-transitory computer-readable medium is provided. The non-transitory computer-readable medium includes all electronic mediums or media of storage, except signals. The non-transitory computer-readable medium stores executable code. When executed by a processor of an electronic device, the executable code causes the processor to store background pixels of a first image frame. The executable code causes the processor to compare the background pixels of the first image frame to background pixels of a second image frame. Responsive to determining a difference between the background pixels of the first image frame and the background pixels of the second image frame, the executable code causes the processor to alter a portion of the background pixels of the second image frame. The executable code also causes the processor to display the second image frame with the altered background pixels.

FIG. 1A is a block diagram of a system 100 for image background alteration in accordance with various examples. System 100 is an electronic device that may be a desktop computer, notebook, laptop, tablet, smartphone, or other electronic device. System 100 includes a processor 102, memory 104, display 106, and video source 108. Memory 104 includes executable code 110 and 112. Processor 102 may be a central processing unit, a graphics processing unit, a microprocessor, a microcontroller, or any other component for performing the operations described herein. Memory 104 may be a hard drive, a solid-state drive (SSD), flash memory, random access memory (RAM), or other suitable memory device. Memory 104 may also include multiple memory devices or chips in some examples. Display 106 is any suitable type of display for displaying moving or static images. Video source 108 may be a camera that captures video and provides the video to system 100 for display in an example. Video source 108 may be a stored video file or files in another example.

In operation of an example described herein, video is provided by video source 108 to system 100. In one example, video source 108 is a camera such as a web camera on a personal computer. A user participates in a video call using the web camera in one example. The user may use any commercial or proprietary video conference application to engage in the video call. In this example, the user is in front of the camera and the user's image is being transmitted to other viewers of the video call. The background of the environment that the user is situated in is also captured by the camera and transmitted to the other viewers. The user may be situated in an office, a home, an airport, a restaurant, a train station, or another public or private place. Some commercial video conference applications allow the user to replace the user's actual background with a video or image. However, if the user wishes to use the actual background of the environment the user is situated in, motion of people or other objects in the background may be distracting to the other viewers.

In an example, system 100 performs segmentation and motion detection to determine if motion is occurring in the background of the video. Segmentation may be performed by processor 102 executing executable code 110 stored in memory 104. Segmentation is performed to distinguish the foreground of the video (such as the user or users on the video call) from the background of the video. Segmentation may be performed on each frame of the video as those frames are received from video source 108. After segmentation is performed, motion detection is performed by analyzing the background of the video frames. Processor 102 performs motion detection by executing executable code 112 stored in memory 104. In one example, motion detection is performed by comparing pixels of a first frame to pixels of a second frame. The second frame may be the immediate frame after the first frame in an example. In another example, the second frame may be separated from the first frame by any number of other frames. Motion is detected by comparing the background portion of the first frame to the background portion of the second frame. If a change is detected in the background portion from the first frame to the second frame, motion is detected. Additional aspects of motion detection are described with respect to FIG. 2 below. If no motion is detected in the background, or if a small acceptable amount of motion is detected in the background, the background is displayed normally, without alteration, to the viewers on the video call. If an amount of background motion is detected that is above an acceptable threshold, a mitigation action may be taken to alter the background. The mitigation action is performed to obscure, partially obscure, or otherwise block the background motion in the video, so certain images in the background (e.g., distracting movement) are not unintentionally shared.

A change or difference in the background pixels between the first frame and the second frame may be detected using any of a variety of methods. As one example, a pixel-by-pixel comparison may be performed between the two frames. The color and/or the light intensity of the pixels may be compared. Image histograms may be used to compare the frames in another example. A histogram may be a graph of the pixel intensity for a frame. One of both of the frames may be aligned, resized, or cropped before the comparison is performed in some examples. One or both of the frames may be normalized before the comparison, which may help if light levels change from one frame to the other. Noise reduction may be performed on the frames in some examples. The frames may be compressed before the comparison is performed in another example. The frames may be converted to grayscale before the comparison in some examples. For any of the comparison methods and techniques, a threshold may be set, and changes below the threshold may be ignored in some examples. If the amount of change between the two frames exceeds the threshold, a mitigation action may be performed.

One example of a mitigation action is blurring all or a portion of the background. As one example, if a user is engaged in a video call in a coffee shop, background motion may be detected if another customer walks through the field of view of the camera behind the user. The background may be blurred to obscure the other customer walking past the camera. In some examples, the entire background is blurred. In other examples, portions of the background may be blurred while other portions of the background remain un-blurred. A user setting may allow the user to determine whether all or just a portion of the background should be blurred. The user setting may also allow the user to select how much of the background should be blurred when motion is detected. For example, the pixels that change from the first frame to the second frame may be blurred while other pixels that do not change from the first frame to the second frame remain un-blurred. In another example, the pixels that change from frame to frame may be blurred along with pixels near or adjacent to the pixels that changed. Other pixels could remain un-blurred. The user may adjust the settings to select how much background blur is applied when motion is detected. In another example, the user may also adjust a setting to select whether the blur is a heavy blur or a light blur. A heavy blur may obscure the pixels more than a light blur.

The user may also select how quickly or gradually a blur is applied to the video if motion is detected. In one example, each frame of the video is compared to the next sequential frame to detect motion. If motion occurs over a large number of sequential frames, the background may be blurred gradually, with the blur increasing as the motion continues. A light blur could be applied to the early frames, with the later frames receiving heavier blur. Stated another way, blur may be applied with a fade-in effect. If the motion in the background stops, the blur may be removed gradually over a number of subsequent frames by using a fade-out effect in some examples.

Applying blur or another mitigation action may be stopped when the motion stops. If two sequential frames match, or if the difference between the two frames is below a threshold for motion detection, system 100 may stop applying the mitigation action to the frames. The two frames would be displayed normally, without any mitigation action performed on the background. Normal display of the background would continue, without any mitigation action, until motion is detected again.

Another example of a mitigation action is to apply a solid color (black, white, blue, etc.) over the background instead of blurring the background if motion is detected. The user could select the color, along with how gradually to apply the color to the background (e.g., instantly or over a specific number of frames). The solid color could obscure the background so that motion in the background is not distracting to other viewers. In addition, the solid color could be applied to either the whole background or a portion of the background, as determined by the user.

Another example of a mitigation action is to apply an image or video over the background if motion is detected. The user could select an image or video to apply to the background if motion is detected. The image or video could be any suitable image or video, such as a photograph, a painting, a patterned image, a video with an acceptable amount of motion, etc. The image or video could be applied instantly when motion is detected or gradually over a number of frames. The image or video could also be applied to a portion of the background or the entire background. The user may select any suitable image or vide that the user believes is sufficient to obscure motion in the background of the video.

FIG. 1B is a diagram depicting human segmentation of an image 150 in accordance with various examples. Human segmentation is a process based on face and body part recognition, with the goal of separating the person in the frame from the background. A number of suitable techniques may be used for performing human segmentation, including the use of commercial segmentation products. In one example, a machine learning model with a neural network distinguishes faces and body parts from the background of a video. The neural network groups pixels from an image or frame into semantic areas of objects. Pixels are classified into two classes: person and non-person.

Image 150 shows an outline of a person positioned in front of a camera. One frame of the video is shown as image 150. In this example, a segmentation program, such as executable code 110 executed by processor 102, has classified portion 152 as a person. Executable code 110 identified a number of points 154A to 154J as body parts of a person. Points 154A, 154B, 154C, and 154D are identified as arms and shoulders of a person in image 150. Points 154E, 154F, 154G, 154H, and 154J are identified as body parts of a person's face in image 150. Therefore, the portion 152 is identified as a person. The other portion of image 150, which is portion 156, is classified as non-person. In examples herein, the non-person portion 156 is considered the background, and the non-person portion 156 is where motion detection is applied via executable code 112. Therefore, portion 156 represents the background pixels of image 150.

Segmentation is performed on each frame of a video source as the frames are received by system 100. In an example, a first frame is received from video source 108.

Processor 102 performs segmentation (using executable code 110) on the first frame to classify each pixel of the first frame as person or non-person. The first frame and the classification of each pixel are stored in memory 104 in one example. Next, a second frame is received from video source 108. Processor 102 performs segmentation on the second frame to classify each pixel of the second frame as person or non-person. The second frame and the classification of each pixel may also be stored in memory 104.

Processor 102 then performs motion detection of the background images using executable code 112. Motion detection may be performed using any suitable technique. In one example, motion detection is performed by comparing the non-person pixels of the first frame to the non-person pixels of the second frame. The pixels that were determined to be part of a person are ignored for this analysis. The non-person pixels are compared, and if a pixel changes from the first frame to the second frame, motion is detected for that pixel. If motion is detected, a mitigation action may be taken. The mitigation action is applied to the second frame. The first frame may be sent to the display 106 for display, and the mitigation action is performed on the second frame before the second frame is sent to display 106 for display. The mitigation action may include blurring part or all of the background of the second frame, or applying an image or video to all or part of the background of the second frame. After the mitigation action is applied to the second frame, the second frame is sent to display 106 for display.

Processor 102 also performs segmentation on the next frame (e.g., a third frame). After segmentation is performed on the third frame, the non-person pixels of the third frame are compared to the non-person pixels of the original (non-altered) second frame. The pixels in the second frame used for the comparison are the pixels as they appeared before the mitigation action was applied to the second frame. If a difference is found between non-person pixels in the third frame and non-person pixels in the second frame, a mitigation action may be applied to the third frame. This process continues for each frame of the video, with each subsequent frame compared to the previous frame.

In some examples, the user may select a sensitivity level for the motion detection process. Stated another way, the user may adjust a setting to allow a certain amount of motion before a mitigation action is applied. For example, if a user is sitting in an office in front of a window, and a tree is visible through the window, the user may allow a small amount of movement of the leaves and branches of the tree without applying a mitigation action. A slight movement of the tree caused by the wind would not result in blur or another mitigation action applied to the background. However, large movements in the background could still result in mitigation actions. For example, if another person walked into the office and was visible through the user's camera, the user settings may classify this amount of movement as enough movement to trigger the motion detection and apply a mitigation action. The user settings may create a predetermined threshold for the number of pixels that change from a first frame to a second frame before motion is detected. The predetermined threshold may be triggered by a number of non-person pixels exceeding the threshold changing from one frame to the next (for example, 100 or more pixels), or the threshold may be triggered by a percentage of the non-person pixels changing from one frame to the next (for example, 5% or more of the non-person pixels). Other predetermined thresholds may be used in other examples for determining that motion has been detected in the background. A user may adjust the predetermined threshold at any time, even while a video is being displayed.

In another example, the user may select how quickly or gradually to apply the mitigation actions. A user may adjust a setting that allows motion in the background for a predetermined number of frames. If the motion continues beyond that predetermined number of frames, a mitigation action is performed on subsequent frames until the motion ceases or drops below an acceptable threshold. In this example, more than two frames may be analyzed for motion detection using executable code 112. The mitigation action may be applied if enough pixels change over a predetermined number of frames. If the motion stops after a number of frames that is lower than the predetermined number of frames, the mitigation action may not be applied.

As described herein, motion detection is performed on the background of the image or frame. Therefore, motion of the person in the video, as determined by human segmentation, is ignored. In this example, the pixels that form portion 152 are ignored for motion detection. In another example, if two or more persons are in the foreground of the frame, the human segmentation process identifies each person, and the pixels that form each person are ignored for motion detection.

Figure 2:
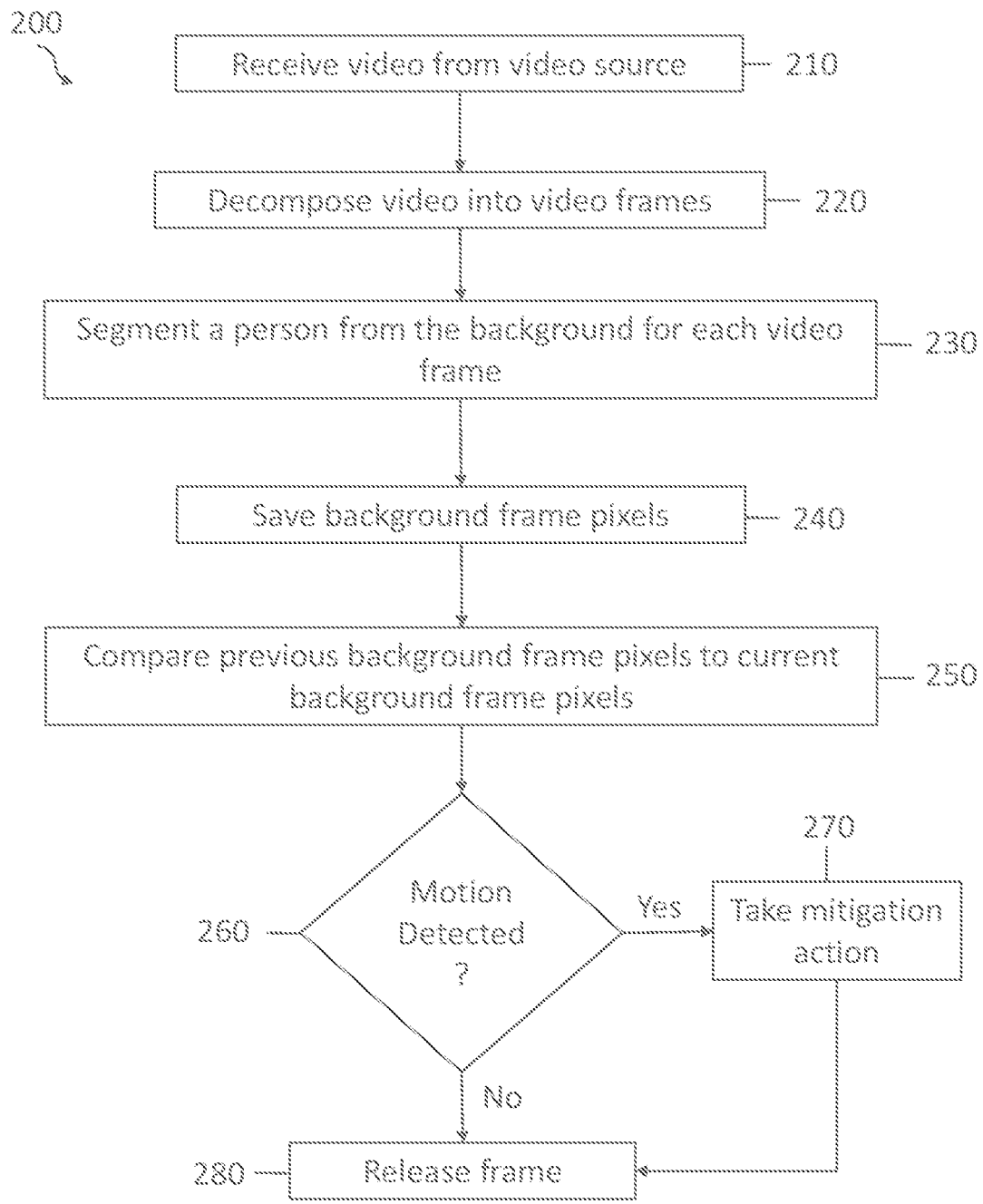
FIG. 2 is a flow diagram of a process for background image alteration in accordance with various examples.

FIG. 2 is a flow diagram of a process 200 for background image alteration in accordance with various examples herein. The actions performed in process 200 may be performed in any suitable order. The hardware components described above with respect to FIG. 1A may perform process 200 in some examples.

Process 200 begins at block 210, where a video is received from a video source. The video source may be a camera in one example. In another example, the video source may be a memory that stores the video.

Process 200 continues at block 220, where the video is decomposed into video frames. A processor such as processor 102 may decompose the video into video frames.

Process 200 continues at block 230, where segmentation is performed to segment a person or persons from the background for each video frame. Segmentation may be performed by processor 102 executing executable code 110 in one example. In some examples, machine learning inference hardware may be used, such as chips utilizing field programmable gate arrays (FPGAs). Segmentation may be performed using any suitable techniques, such as commercially available or open-source programs.

Process 200 continues at block 240, where background frame pixels are saved for each video frame. The background frame pixels may be saved in memory 104 in one example. The background frame pixels for multiple frames may be saved in some examples.

Process 200 continues at block 250, where the previous background frame pixels are compared to current background frame pixels. Processor 102 may perform the comparison using executable code 112 in one example. The comparison is performed to determine any difference between the background pixels from frame to frame, which indicates that motion has occurred. As described above, a minimum threshold for motion may be set by a user, so that some motion is allowed without triggering the mitigation actions.

Process 200 continues at block 260, where processor 102 determines if motion is detected. Motion may be detected by finding a difference between the previous background frame pixels and the current background frame pixels. If the difference between the background pixels in the frames is above a threshold, motion is detected. In some example, the previous background frame and the current background frame may be non-sequential frames in the video source. Some frames may be skipped in some examples. In other examples, more than two frames may be compared to detect motion that may continue across multiple frames.

If motion is detected at block 260, process 200 proceeds to block 270. At block 270, a mitigation action is performed. The mitigation action may be any action taken to obscure the motion that is detected at block 260. For example, the mitigation action may be blurring the background of the current frame or a portion of the background of the current frame. In another example, the mitigation action may be replacing the background or a portion of the background with an image or video. The background or a portion of the background may be replaced with a solid color in some examples. The mitigation action may be applied gradually, over a number of frames, in some examples. After the mitigation action is taken, process 200 proceeds to block 280.

If no motion is detected at block 260, process 200 proceeds to block 280. At block 280, the frame is released for display. The frame may be provided to any suitable display, such as display 106. The frame may also be transmitted over a network to a display. If a mitigation action was performed in block 270, the frame shows the results of the mitigation action, such as a blurred background. If no mitigation was taken, the frame is displayed as it was received from the video source.

Process 200 is repeated for each frame of the video source in one example. Segmentation and motion detection may be performed continuously on the frames of a video as those frames are received from the video source.

Figure 3:
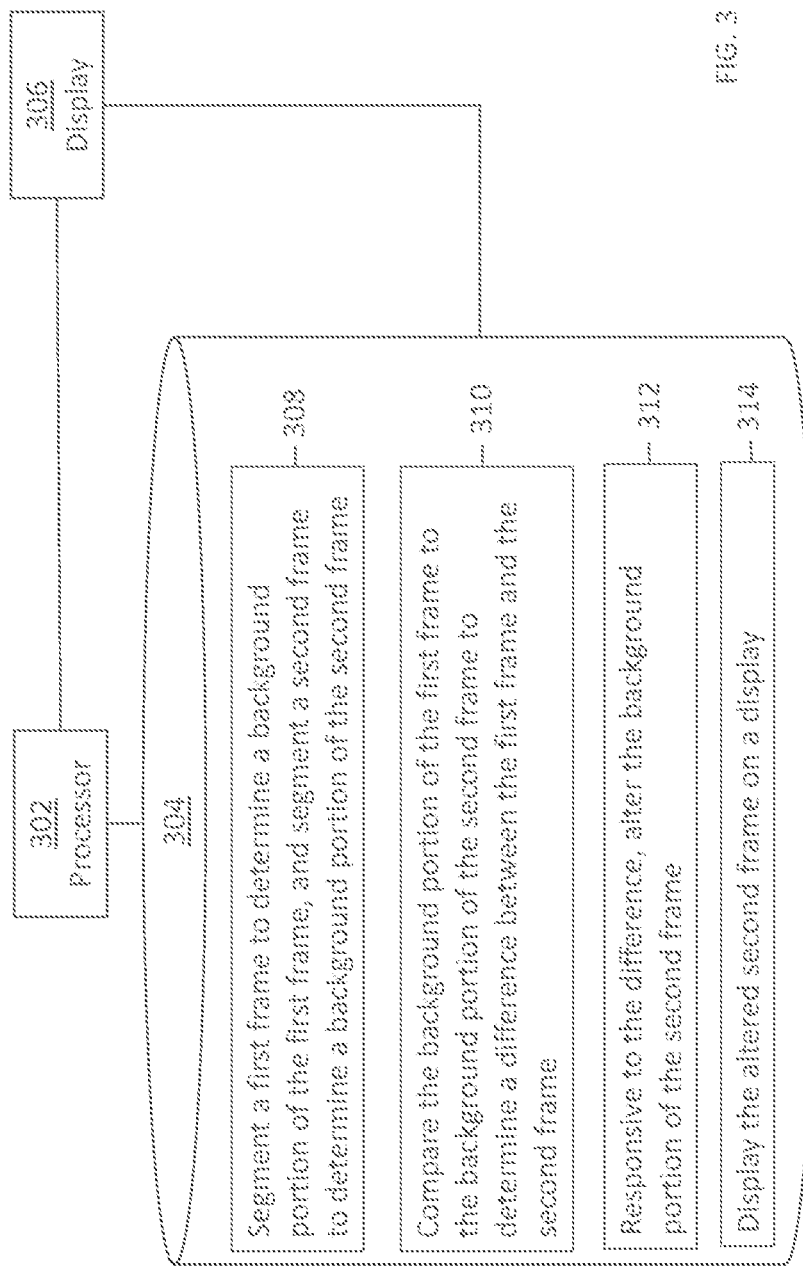
FIG. 3 is a diagram of a system including a non-transitory computer-readable medium storing executable code for background image alteration in accordance with various examples.

FIG. 3 is a diagram of a system 300 including a non-transitory computer-readable medium storing executable code for background image alteration in accordance with various examples described herein. System 300 includes a processor 302, a storage device 304, and a display 306. Storage device 304 includes executable code 308, 310, 312, and 314. Processor 302 may be processor 102 shown in FIG. 1 in one example. Storage device 304 may include memory 104 shown in FIG. 1 in one example. Display 306 may be display 106 shown in FIG. 1 in one example.

System 300 provides background image alteration as described herein. A video source, such as video source 108 shown in FIG. 1, provides frames of a video to system 300. Processor 302 executes executable code 308, 310, 312, and 314 to provide background image alteration to the video. Processor 302 executes executable code 308 to segment a first frame to determine a background portion of the first frame, and to segment a second frame to determine a background portion of the second frame. The pixels that form the background portion of the first frame and the background portion of the second frame may be stored in a memory or storage device, such as memory 104 or storage device 304. Pixels of more than two frames may be stored in some examples. Also, more than two frames may be segmented using executable code 308 in some examples.

Processor 302 executes executable code 310 to compare the background portion of the first frame to the background portion of the second frame, to determine a difference between the first frame and the second frame. The background portions of the frames are compared to determine if motion has occurred in the background of the video. A difference in the frames indicates that motion has occurred. In some examples, more than two frames may be compared, to determine if the motion is continuous across a larger number of frames. Motion that is not continuous across a larger number of frames may be ignored in some examples. In some examples, the difference in the pixels may have to reach a predetermined threshold (such as a user-defined threshold) for motion to be detected.

Processor 302 executes executable code 312 to alter the background portion of the second frame responsive to a difference between the background portion of the first frame and the background portion of the second frame. If no difference exists between the background portion of the first frame and the background portion of the second frame, no mitigation action or alteration is performed on the second frame. However, if a difference is detected, and that difference is above a predetermined threshold, the background portion of the second frame is altered. The background portion may be altered by blurring all or part of the background portion in one example. The background portion may be altered by replacing all or part of the background portion with an image, a video, or a solid color.

Processor 302 executes executable code 314 to display the altered second frame on a display. The altered second frame may be displayed on display 306 in one example. Processor 302 may repeat the execution of executable code 308, 310, 312, and 314 for each subsequent frame received from the video source.

Figure 4:
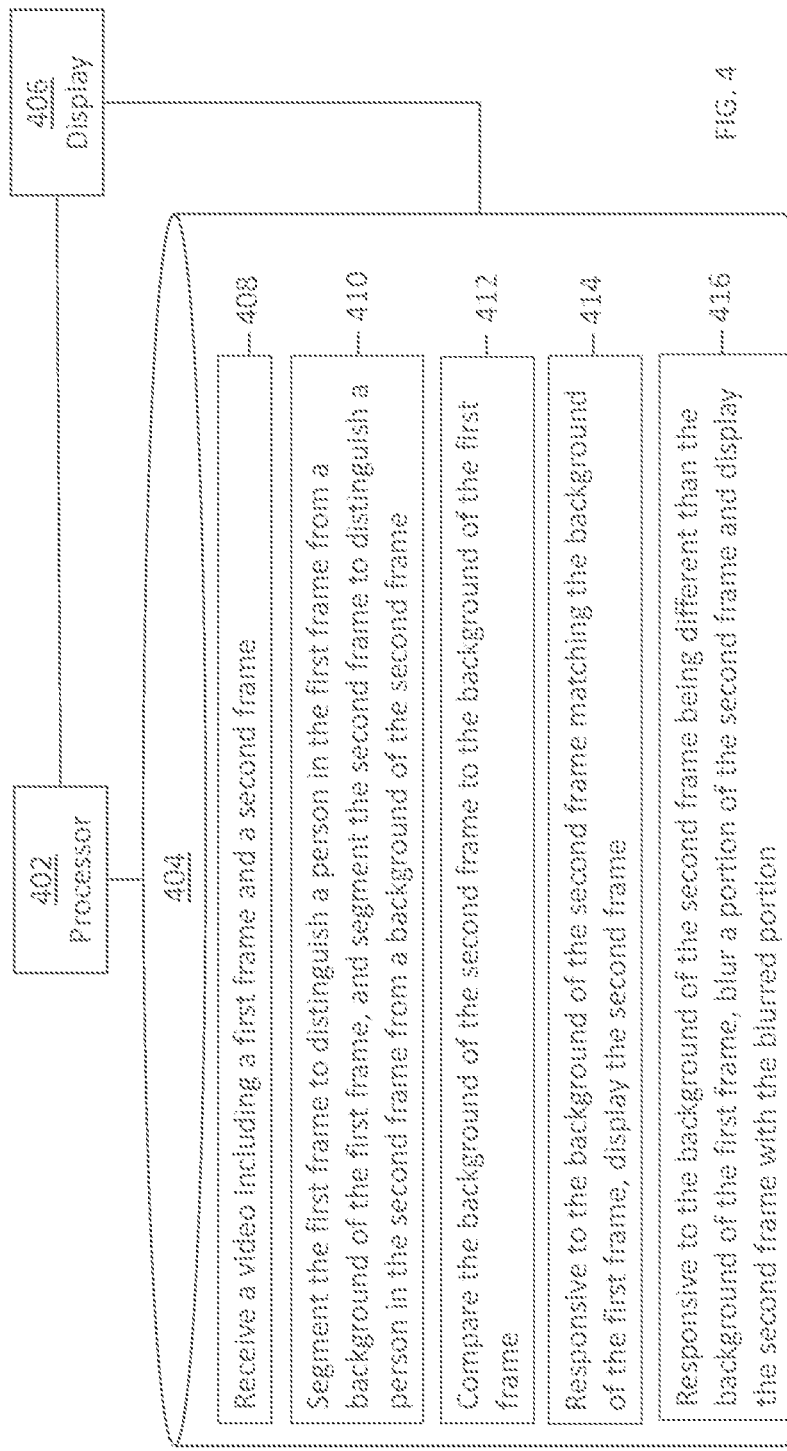
FIG. 4 is a diagram of an electronic device for background image alteration in accordance with various examples.

FIG. 4 is a diagram of an electronic device 400 for background image alteration in accordance with various examples described herein. Electronic device 400 includes a processor 402, a storage device 404, and a display 406. In some examples, storage device 404 and/or display 406 may be separate from electronic device 400. Storage device 404 includes executable code 408, 410, 412, 414, and 416. Processor 402 may be processor 102 shown in FIG. 1 in one example. Storage device 404 may include memory 104 shown in FIG. 1 in one example. Display 406 may be display 106 shown in FIG. 1 in one example.

Electronic device 400 provides background image alteration as described herein. Processor 402 executes executable code 408, 410, 412, 414, and 416 to provide background image alteration to the video. Processor 402 executes executable code 408 to receive a video including a first frame and a second frame. The first frame and second frame may be stored in a suitable storage device by processor 402 for processing in accordance with various examples herein. In one example, the video frames may be stored in storage device 404.

Processor 402 executes executable code 410 to segment the first frame to distinguish a person in the first frame from a background of the first frame, and to segment the second frame to distinguish a person in the second frame from a background of the second frame. The pixels that form the background portion of the first frame and the background portion of the second frame may be stored in a memory or storage device, such as memory 104 or storage device 404. Pixels of more than two frames may be stored in some examples. Also, more than two frames may be segmented using executable code 410 in some examples.

Processor 402 executes executable code 412 to compare the background of the second frame to the background of the first frame. The background portions of the frames are compared to determine if motion has occurred in the background of the video. A difference in the frames indicates that motion has occurred. In some examples, more than two frames may be compared, to determine if the motion is continuous across a larger number of frames. Motion that is not continuous across a larger number of frames may be ignored in some examples. In some examples, the difference in the pixels may have to reach a predetermined threshold (such as a user-defined threshold) for motion to be detected.

Processor 402 executes executable code 414 to display the second frame responsive to the background of the second frame matching the background of the first frame. If the background of the second frame matches the background of the first frame (e.g., the difference between the frames is below an acceptable threshold), no motion is detected in the background between the two frames. If no motion is detected, the second frame may be displayed without alteration.

Processor 402 executes executable code 416 to blur a portion of the second frame and display the second frame with the blurred portion responsive to the background of the second frame being different than the background of the first frame. The difference between the first frame and the second frame may have to reach a predetermined threshold before the second frame is blurred in some examples. Stated another way, in some examples a small difference between the backgrounds of the first frame and the second frame is ignored and the frames are displayed without background image alteration. In other examples, the second frame may be altered by a mitigation action other than blurring. For example, the second frame may be altered by replacing all or part of the background with an image, a video, or a solid color.

FIG. 5 is a diagram of a system 500 including a non-transitory computer-readable medium storing executable code for background image alteration in accordance with various examples described herein. System 500 includes a processor 502, a storage device 504, and a display 506. Storage device 504 includes executable code 508, 510, 512, and 514. Processor 502 may be processor 102 shown in FIG. 1 in one example. Storage device 504 may include memory 104 shown in FIG. 1 in one example. Display 506 may be display 106 shown in FIG. 1 in one example.

System 500 provides background image alteration as described herein. Processor 502 executes executable code 508, 510, 512, and 514 to provide background image alteration to the video. Processor 502 executes executable code 508 to store background pixels of a first image frame. The background pixels of the first image frame may be stored in storage device 504 in one example. The first image frame may be provided to processor 502 via a video source, such as video source 108. Video source 108 may be a camera in one example.

Processor 502 executes executable code 510 to compare the background pixels of the first image frame to background pixels of a second image frame. Segmentation has been performed on the image frames to separate the background pixels from a person or persons in the image frames. The comparison is performed on the background pixels to detect if motion has occurred in the background between the first image frame and the second image frame. A difference in the background pixels indicate that motion has occurred. In some examples, if the difference in the background pixels is below a predetermined threshold, the difference is ignored and motion is not detected.

Processor 502 executes executable code 512 to alter a portion of the background pixels of the second image frame responsive to determining a difference between the background pixels of the first image frame and the background pixels of the second image frame. The difference between the background pixels of the first image frame and the background pixels of the second image frame indicates that motion has occurred in the video. If motion has occurred, the second frame is altered to obscure the motion. The second frame may be altered by blurring all or a portion of the background of the second frame. In another example, the second frame may be altered by replacing all or a portion of the background with an image, a video, or a solid color.

Processor 502 executes executable code 514 to display the second image frame with the altered background pixels. In one example, the second image frame may be displayed on display 506. In another example, the second image frame may be transmitted over a network and displayed on another display or on multiple displays.

As described herein, machine learning techniques and image transformations are used to automatically perform a mitigation action on a background of a video responsive to detecting certain conditions. Users may therefore use the background of the environment the users are in, and the examples herein intelligently blur or otherwise obscure the background responsive to the detection of certain conditions to avoid distractions for a viewer.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Additionally, the word "or" is used in an inclusive manner. For example, "A or B" means any of the following: "A" alone, "B" alone, or both "A" and "B".

What is claimed is:

1. A non-transitory computer-readable medium storing executable code, which, when executed by a processor of an electronic device, causes the processor to:
    segment a first frame to determine a background portion of the first frame, and segment a second frame to determine a background portion of the second frame;
    compare the background portion of the first frame to the background portion of the second frame to determine a difference between the first frame and the second frame by detecting a difference between pixels of the first frame and pixels of the second frame;
    responsive to the difference between pixels of the first frame and pixels of the second frame exceeding a predetermined threshold, alter the background portion of the second frame; and
    display the altered second frame on a display.

2. The non-transitory computer-readable medium of claim 1, wherein the executable code, when executed by the processor, causes the processor to alter the background portion of the second frame by applying blur to the background portion of the second frame.

3. The non-transitory computer-readable medium of claim 1, wherein the executable code, when executed by the processor, causes the processor to alter the background portion of the second frame by applying an image to the background portion of the second frame.

4. An electronic device, comprising:
    a processor to:
        receive a video including a first frame and a second frame;
        segment the first frame to distinguish a person in the first frame from a background of the first frame, and segment the second frame to distinguish a person in the second frame from a background of the second frame;
        compare the background of the second frame to the background of the first frame;
        responsive to the background of the second frame matching the background of the first frame, display the second frame; and
        responsive to the background of the second frame being different than the background of the first frame, blur a portion of the second frame and display the second frame with the blurred portion, wherein the background of the second frame being different than the background of the first frame comprises a change in a predetermined number of pixels between the background of the second frame and the background of the first frame.

5. The electronic device of claim 4, wherein blurring a portion of the second frame includes blurring all pixels of the background of the second frame.

6. The electronic device of claim 4, wherein the processor is to:
    receive a third frame;
    segment the third frame to distinguish a person in the third frame from a background of the third frame;
    compare the background of the third frame to the background of the second frame;
    responsive to the background of the third frame matching the background of the second frame, display the third frame; and
    responsive to the background of the third frame being different than the background of the second frame, blur a portion of the third frame and display the third frame with the blurred portion.

7. The electronic device of claim 4, wherein the first frame and the second frame are non-sequential frames of the video.

8. A non-transitory computer-readable medium storing executable code, which, when executed by a processor of an electronic device, causes the processor to:
    store background pixels of a first image frame;
    compare the background pixels of the first image frame to background pixels of a second image frame;
    responsive to determining a difference between the background pixels of the first image frame and the background pixels of the second image frame, alter a portion of the background pixels of the second image frame, wherein determining the difference between the background pixels of the first image frame and the background pixels of the second image frame includes determining a difference between a predetermined number of background pixels; and
    display the second image frame with the altered background pixels.

9. The non-transitory computer-readable medium of claim 8, wherein the executable code, when executed by the processor, causes the processor to alter a portion of the background pixels of the second image frame by blurring the portion of the background pixels.

10. The non-transitory computer-readable medium of claim 8, wherein the executable code, when executed by the processor, causes the processor to alter a portion of the background pixels of the second image frame by replacing the portion of the background pixels with a static image.

11. The non-transitory computer-readable medium of claim 8, wherein the executable code, when executed by the processor, causes the processor to alter a portion of the background pixels of the second image frame by replacing the portion of the background pixels with a video.

12. The non-transitory computer-readable medium of claim 1, wherein the first frame and the second frame are non-sequential frames of a video.

13. The non-transitory computer-readable medium of claim 1, wherein the executable code, when executed by the processor, causes the processor to alter a portion of the background pixels of the second image frame by replacing the portion of the background pixels with a video.

14. The non-transitory computer-readable medium of claim 1, wherein the executable code, when executed by the processor, causes the processor to
receive a third frame;
segment the third frame to distinguish a person in the third frame from a background portion of the third frame;
compare the background portion of the third frame to the background portion of the second frame;
responsive to the background portion of the third frame matching the background portion of the second frame, display the third frame; and
responsive to the background portion of the third frame being different than the background portion of the second frame, alter a portion of the third frame and display the third frame with the altered portion.

15. The non-transitory computer-readable medium of claim 8, wherein the first frame and the second frame are non-sequential frames of a video.

16. The non-transitory computer-readable medium of claim 8, wherein the executable code, when executed by the processor, causes the processor to
receive a third frame;
segment the third frame to distinguish a person in the third frame from background pixels of the third frame;
compare the background pixels of the third frame to the background pixels of the second frame;
responsive to the background pixels of the third frame matching the background pixels of the second frame, display the third frame; and
responsive to the background pixels of the third frame being different than the background pixels of the second frame, alter a portion of the third frame and display the third frame with the altered portion.

* * * * *